(12) United States Patent
Chen et al.

(10) Patent No.: US 8,000,575 B2
(45) Date of Patent: Aug. 16, 2011

(54) POLARIZATION MAINTAINING AND SINGLE POLARIZATION OPTICAL FIBER

(75) Inventors: Xin Chen, Corning, NY (US); Stuart Gray, Corning, NY (US); Ming-Jun Li, Horseheads, NY (US); Donnell Thaddeus Walton, Painted Post, NY (US); Ji Wang, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 47 days.

(21) Appl. No.: 12/221,015

(22) Filed: Jul. 30, 2008

(65) Prior Publication Data
US 2009/0060435 A1 Mar. 5, 2009

Related U.S. Application Data

(60) Provisional application No. 60/962,716, filed on Sep. 4, 2007.

(51) Int. Cl.
*G02B 6/02* (2006.01)
*G02B 6/00* (2006.01)
(52) U.S. Cl. ................................ 385/123; 385/141
(58) Field of Classification Search .................. None
See application file for complete search history.

(56) References Cited

U.S. PATENT DOCUMENTS

| | | | | |
|---|---|---|---|---|
| 4,838,916 A | * | 6/1989 | Edahiro et al. | 65/412 |
| 6,483,973 B1 | * | 11/2002 | Mazzarese et al. | 385/123 |
| 2004/0086245 A1 | | 5/2004 | Farroni et al. | 385/123 |
| 2004/0258341 A1 | | 12/2004 | Paolucci et al. | 385/4 |
| 2005/0244118 A1 | | 11/2005 | Berkey et al. | 385/123 |
| 2006/0029344 A1 | * | 2/2006 | Farroni et al. | 385/123 |
| 2006/0045446 A1 | | 3/2006 | Berkey et al. | 385/123 |
| 2006/0088261 A1 | | 4/2006 | Berkey et al. | 385/123 |
| 2006/0191295 A1 | * | 8/2006 | Dowd et al. | 65/404 |
| 2008/0095199 A1 | * | 4/2008 | Abramczyk | 372/6 |
| 2009/0252468 A1 | * | 10/2009 | Sugizaki et al. | 385/123 |

FOREIGN PATENT DOCUMENTS

| | | |
|---|---|---|
| EP | 0561276 | 3/1993 |
| WO | 2007/089421 | 8/2007 |

OTHER PUBLICATIONS

"Design and Fabrication of Panda-type erbium-doped polarization-maintaining fibres"; Kai et al; 2007 Chinese Physics Society and IOP Publishing Ltd.; vol. 16, No. 2, Feb. 2007; 1009-1963/2007/16(02)/0478-07.
"General Solutions for Stress-Induced Polarization in Optical Fibers"; Tsai et al; Journal of Lightwave Technology; vol. 9, No. 1' p. 7-17; (1991).
"The Stress-Optic Effect in Optical Fibers"; Barlow et al; Journal of Quantum Electronics; vol. 19, No. 5; p. 834-839; (1983).

\* cited by examiner

*Primary Examiner* — Uyen-Chau Le
*Assistant Examiner* — Chris Chu
(74) *Attorney, Agent, or Firm* — Svetlana Z. Short

(57) ABSTRACT

An optical fiber, comprising: (i) a core, (ii) a cladding surrounding the core, (iii) at least one stress member adjacent the fiber core and situated within the cladding, said stress member comprising silica co-doped with B and F.

20 Claims, 3 Drawing Sheets

POLARIZATION MAINTAINING AND SINGLE POLARIZATION OPTICAL FIBER

This application claims the benefit of and priority to U.S. Patent Application No. 60/962,716 filed on Sep. 4, 2007, the content of which is relied upon and incorporated herein by reference in its entirety. Parts of this invention were made with Government support under Agreement No. L02094 awarded by DARPA. The Government may have certain rights in some of the claims of the invention.

This invention was made with Government support under Cooperative Agreement No. MDA972-02-3-0004 awarded by The Defense Advanced Research Projects Agency. The Government has certain rights in some this invention.

BACKGROUND OF THE INVENTION

1. Field of the Invention

The present invention relates generally to optical fiber, and more particularly to a polarization maintaining and/or single polarization optical fiber.

2. Technical Background

Polarization maintaining (PM) and single polarization (SP) optical fibers are useful for ultra-high speed transmission systems and many other applications. One type of prior polarization maintaining fiber includes, as shown in FIG. 1, a central core 10 surrounded by a cladding 11. Core 10 and cladding 11 are formed of conventional materials employed in the formation of optical waveguides. The refractive index of the core material is greater than that of the cladding material. By way of example only, core 10 may consist of silica containing one or more dopants which increase the refractive index thereof, such as germania. Cladding 11 may comprise pure silica, silica containing a lesser amount of dopant than core 10, or silica containing one or more down dopants, at least one of which is an oxide of an element such as boron or fluorine which lowers the refractive index of silica. In FIG. 1, diametrically opposed relative to core 10, are two regions 12 formed of a glass material (e.g., silica doped with 20 to 25 wt % B) having a coefficient of thermal expansion (CTE) different from that of cladding material 11. When such a fiber is drawn, the longitudinally-extending regions 12 and the cladding regions will shrink different amounts whereby regions 12 will be put into a state of tension or compression depending upon the CTE thereof relative to that of the cladding 11. A strain induced birefringence, which is thus induced by anisotropic thermal stress induced by the mismatch of CTEs between regions 12 and the surrounding regions 11, reduces coupling between the two polarized fundamental modes (with orthogonal polarization directions).

One major drawback of these PM or SP fibers attained through the CTE mismatch (between the cladding 11 and regions 12), is that these fibers are temperature-sensitive due to the fact that the thermal stress changes with temperature. This thermal sensitivity often compromises the stability of the PM or SP performance. Thermal stability of PM an SP fibers is very important for many applications, such as in high-power amps/lasers, high-precision airborne space navigation, and deep-sea (or land) sensor applications, where the fiber can experience dramatic temperature changes during operation. These changes can result in PM/SP characteristic degradation causing deterioration in performance, low navigational accuracy, and possibly a total failure in the device/system if additional, often costly, temperature management is not employed.

SUMMARY OF THE INVENTION

One aspect of the present invention relates to an optical fiber comprising: (i) a core, (ii) a cladding surrounding the core, and (iii) at least one stress member adjacent the fiber core and situated within the cladding, the stress member comprising silica co-doped with both B and F. Preferably, the optical fiber supports polarization maintenance and/or a single polarization mode within an operating wavelength range of 800 nm to 1600 nm (e.g., 850 nm, 1060, 1310, and/or 1550 nm). Preferably the stress member has thermal stress coefficient at and mechanical stress coefficient $\sigma_m$, and $\sigma_t < \sigma_m$.

In one embodiment, the central core is surrounded by this stress member and the stress member is an annular region of boron-fluorine doped silica. In another embodiment, the stress member includes least two stress-applying parts (SAPs) such as B and F doped stress rods situated on opposite sides of the core.

In accordance with some embodiments of the invention, the central core preferably has a delta %, $\Delta_1$, of between about 0.05% and 2.5%. For example, the central core preferably has a delta %, $\Delta_1$, of between about 0.05% and 0.15% for large-mode-area (LMA) PM fibers, for applications where nonlinearity is major impairment or concern such as in high-power fiber lasers, and air-borne-high-precision fiber Gyros etc. In single-mode fibers for use in telecommunications and fiber sensors, the central core delta %, $\Delta_1$ is preferably of between about 0.3% to 2.5%. Furthermore, according to some embodiments, the fiber includes a fluorine-doped (or Fluorine co-doped) region surrounding the central core having a $\Delta\Delta$ %, equal or below −0.0%. By LMA fibers we mean optical fibers that have core diameters of over 20 microns, for example between 20 and 60 microns. Other fiber embodiments disclosed herein are, for examples single-mode fibers with core diameters of about 3 to 15 microns.

One advantage of the polarization maintaining or single polarization fibers according to the embodiments of the present invention is substantially stable polarization maintaining or single polarization performance which has no, or minimal temperature sensitivity.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

For purposes of the description herein, it is to be understood that the invention may assume various alternative configurations and step sequences, except where expressly specified to the contrary. It is also to be understood that the specific fibers and process steps illustrated in the attached drawings, and described in the following specification are exemplary embodiments of the inventive concepts defined in the appended claims. Hence, specific dimensions and other physical characteristics relating to the embodiments disclosed herein are not to be considered as limiting.

Definitions: The following definitions and terminology are commonly used in the art.

Refractive index profile—the refractive index profile is the relationship between the refractive index (Δ%) and the optical fiber radius (as measured from the centerline of the optical fiber) over a selected segment of the fiber.

Relative refractive index percent Δ%—the term Δ% represents a relative measure of refractive index defined by the equation:

$$\Delta\% = 100 \times (n_i^2 - n_c^2)/2n_i^2$$

where $n_i$ is the maximum refractive index of the index profile segment denoted as i, and $n_c$, the reference refractive index. Every point in the segment has an associated relative index measured relative to the reference refractive index.

The optical waveguide fiber 20 in accordance with the embodiments of the present invention is a thermally stable PM and/or SP fiber that utilizes one or more stress applying part(s) (herein referred to as a stress member) doped with both B and F. These stress members may have circular or non circular cross-sections, and may be utilized in many different types of fibers, for example: active (e.g., rare earth doped core) and passive fibers, fibers that have one or more claddings of different materials (e.g., double clad fibers), and large-mode-areas (LMA) fibers, etc. Such fibers provide polarization maintaince and/or single polarization property via the mechanical-stress, rather than the thermal-stress seen in the traditional polarization maintaining PM fibers with B-only-doped silica as the SAPs (thermal stress-applying-part(s)). The mechanical stress achieved in the new polarization maintaining/ single polarization (PM/SP) fiber is temperature-insensitive up to the strain-point of the B/F-codoped-silica (material used for stress member(s)); and thus giving a thermally stable PM-characteristics, and in addition, stable SP operating-window. Temperature-insensitive fiber has, for example, birefringence of the fiber Δn (between two polarization modes) or the beat length changes of less than 20%, preferably less than 15%, and even more preferably less than 10%, and most preferably less than 5% over the temperature range over −60° C. to +120° C.

Figure 1:
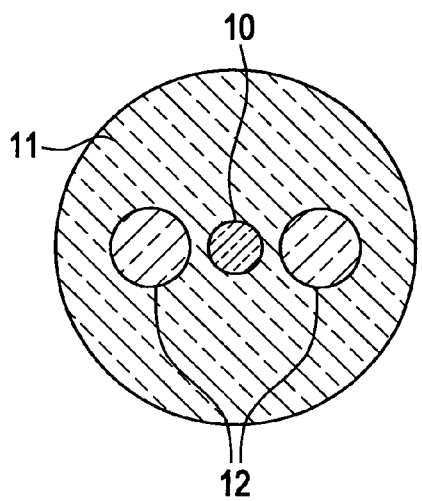
FIG. 1 is a schematic cross-sectional view of an optical waveguide of the prior art.
Figure 2A:
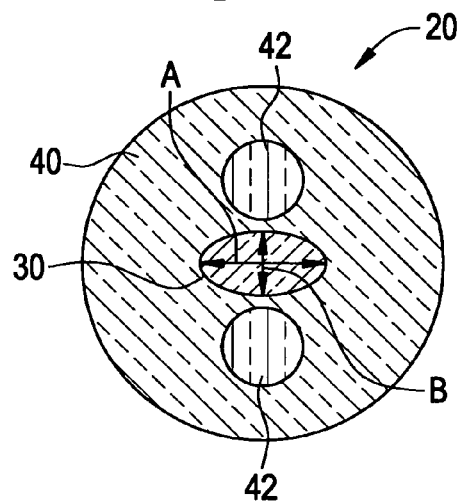
FIG. 2A is a schematic cross-sectional view of a first embodiment of the polarization maintaining optical fiber in accordance with the present invention.

A first embodiment of the polarization maintaining or single polarization optical waveguide fiber 20 in accordance with the invention described and disclosed herein has a cross-sectional structure, as best shown in FIGS. 2A. In the illustrated embodiment, the optical waveguide fiber 20 includes a center core 30 extending along the longitudinal axis of the fiber. This core 30 may be either (i) circular, with typical diameters between 3 and 15 microns, or (ii) elongated (e.g. elliptical) with a maximum dimension, A, and a minimum dimension, B. If the core 30 is elongated, it is preferable that fiber 20 exhibits a first aspect ratio, AR1, defined as A/B, of greater than 1.5; preferably between about 1.5 and 8; more preferably between 2 and 5. The core 30 is surrounded by fiber cladding 40 which includes and/or surrounds at least one stress member 42.

Central core 30 is manufactured, for example, from germania-doped silica, wherein germania is provided in a sufficient amount such that the core exhibits a core delta %, $\Delta_1$, between about 0.05% and 2.5%; for example preferably between about 0.3% and 1.3%; and in one embodiment about 1.1%. If the fiber is a large mode area (LMA) fiber, it is preferable that the core delta %, $\Delta_0$, be between about 0.05% and 0.15%; and more preferably between about 0.07% and 0.11%; for example 0.1%. If the core is elongated, an average diameter, d avg={A+B}/2, of the core 30 is preferably between about 3 and 12 microns; more preferably between 4 and 10 microns.

Figure 2B:
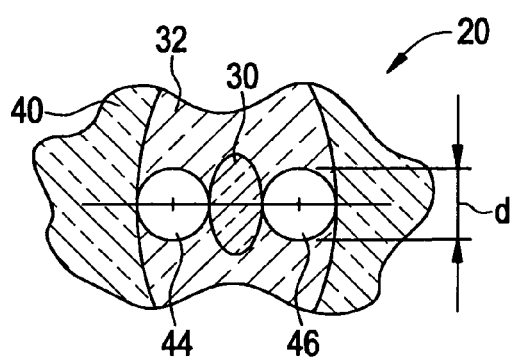
FIG. 2B is a partial schematic cross-sectional view of a first embodiment of the single polarization optical fiber in accordance with the present invention.

As shown in FIG. 2B, the core 30 may be surrounded by an optional annular region 32 having a different composition than the core 30; preferably being of a refractive index less than the core. Accordingly, the annular region 32 is preferably down-doped relative to pure silica, and is therefore most preferably manufactured from fluorine-doped, or from Boron and Fluorine codoped silica. With F down-doping, annular region 32 may exhibit a delta %, $\Delta_2$, of between about −0.0% and −0.7%; more preferably between about −0.2% and −0.6%; and most preferably about −0.4%. Generally, the glass in the annular region 32 is doped such that it is less viscous at draw temperatures than is the center core 30. The annular region 32 may also have a generally circular or oval shape, and together with the stress member(s) contribute to the single polarization operation between the of the fundamental mode cutoff wavelengths of the two polarization modes. The fiber of FIG. 2B is a single polarization fiber. That is, the fiber exhibits a single polarization band (only one polarization is transmitted in this band, other polarizations are stripped). The single polarization band (SPB) is situated within the 800 nm-1600 nm wavelength range.

Figure 2C:
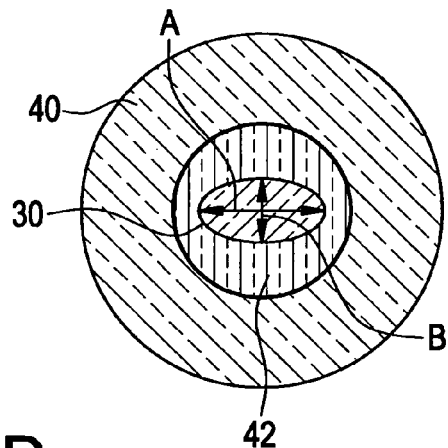
FIG. 2C is a schematic cross-sectional view of a second embodiment of the polarization maintaining optical fiber in accordance with the present invention.
Figure 2D:
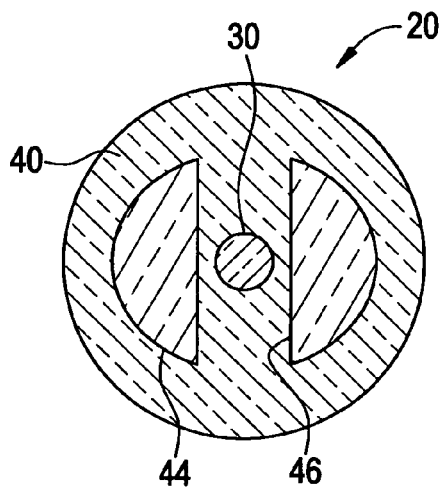
FIG. 2D is a schematic cross-sectional view of a third embodiment of the polarization maintaining optical fiber in accordance with the present invention.

At least one stress member is formed adjacent to the core 30 (FIGS. 2A-2D). For example, FIG. 2C illustrates a stress member 42 that is an annular region of boron-fluorine doped silica surrounding the core. The annular region may be circular (FIG. 2C), or oval. A bow-tie-geometry stress member 42 (not shown) may also be utilized. A stress member may include a plurality of B and F co-doped stress rods. FIGS. 2A, 2B and 2D illustrate stress members that include at least two stress rods 44, 46 situated on opposite sides of the core 30. If the fiber 20 includes the annular region 32, the stress rods 44, 46 may be formed, at least in a part, in the annular region 32 of the fiber 20. The stress rods 44, 46 preferably extend along the entire longitudinal length of the fiber 20, and are preferably of substantially constant dimension along the fiber length. The stress rods 44, 46 are preferably positioned diametrically on opposite sides of the center core 30 and may be entirely or only partially formed in the annular region 32, or if the fiber does not include region 32, be situated in the cladding 40 as shown in FIGS. 2A, 2D. The stress rods 44, 46 may be positioned adjacent to, and aligned with, the minimum core dimension B. The wall-to wall distance between the core and the stress rods can be zero (stress rods touching the core) because there will be no passive loss when B—F co-doped silica is utilized as SAP. The low loss results from the low boron concentration (less than 6 wt % of B). Preferably the stress member, such as the stress rods 44, 46 are situated adjacent to and in very close proximity to the core 30 (for example, having a stress rod edge located within 5 microns and preferably within 3 microns from the edge of core 30). The stress rod cross-section may be circular (FIG. 2A), but may optionally be of other shapes (see, for example, FIG. 2D) and may be of equal or non-equal size. In fibers designed for standard single mode applications (e.g., fibers with outer diameter (OD) of 125 µm, the stress member(s) preferably have a maximum dimension, such as in diameter d or width w of between about 1 to 35 microns; more preferably between about 5 µm and 25 microns, for example 10 to 15 microns or 10 to 20 microns. For large OD LMA fibers, the diameter or width of the stress member can often be up to 30 microns and greater, depending on the application-specific LMA fiber design requirement. For example, the maximum stress rod dimension may be 25 µm to 250 µm for the LMA fiber. An LMA fiber, with 250 µm diameter (or width) stress member may have, for example an outer diameter of about 1 mm. Although only one stress rod is shown on each side of the core 30, multiple rods along each side may also work to provide PM or SP within an operating wavelength band. An exemplary stress member comprising B and F doped silica may include less than 8 wt % of boron and preferably 2 wt %<B<6 wt %, and 1.5 wt %<F<3.5 wt %. For example, in some embodiments the stress member may include 3.8 wt %<B<4.2 wt %, and 2.4 wt %<F<3 wt %. The stress member(s) preferably have CTE which is similar to that of pure silica (or its surrounding doped-silica material) to secure a temperature insensitive PM performance within temperatures of −100° C. to 600° C. For example, the stress member(s) has a CTE preferably between $1 \times 10^{-7}/°$ C. and $15 \times 10^{-7}/°$ C., and more preferably between $3 \times 10^{-7}/°$ C. and $10 \times 10^{-7}/°$ C., and even more preferably between $3 \times 10^{-7}/°$ C. and $8 \times 10^{-7}/°$ C., and even more preferably between $4 \times 10^{-7}/°$ C. and $8 \times 10^{-7}/°$ C., and most preferably between $4 \times 10^{-7}/°$ C. and $7.5 \times 10^{-7}/°$ C.

Figure 3:
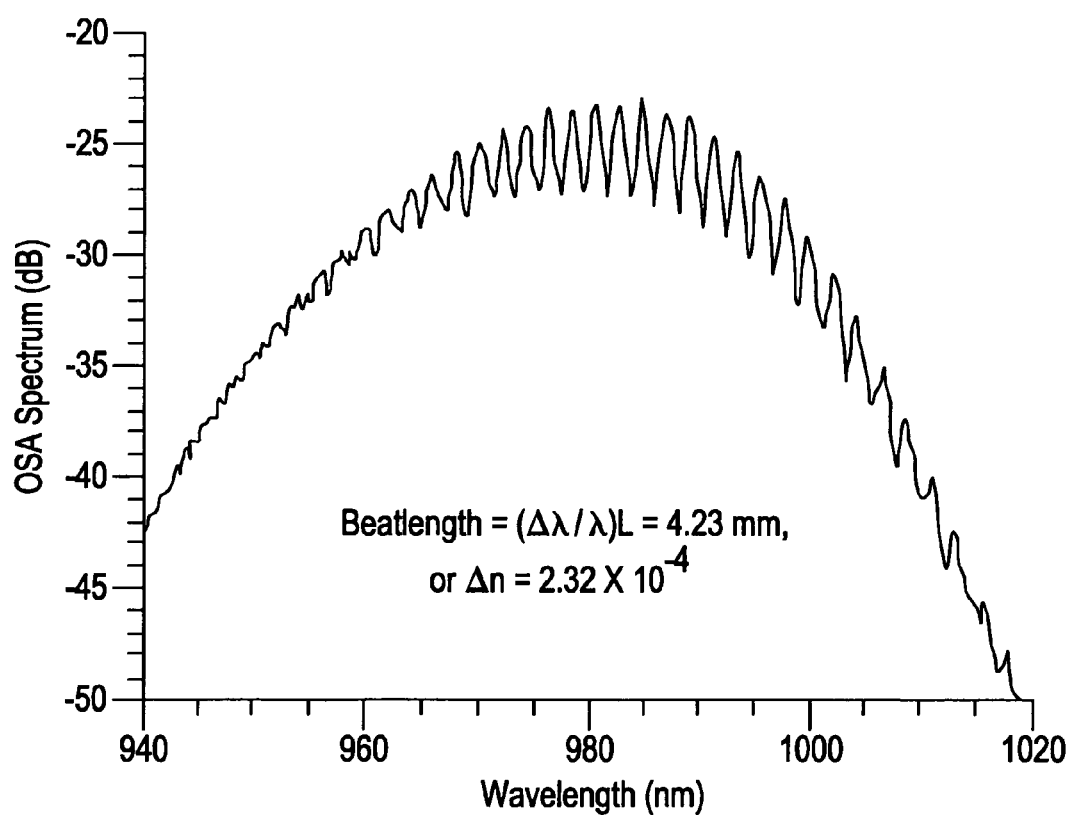
FIG. 3 is a plot measured by OSA (optical spectrum analyzer) showing spectrum (transmitted power in dB units) vs. wavelength of the optical fiber of FIG. 2A.

Preferably, the optical fiber supports polarization maintenance and/or a single polarization mode within an operating wavelength range/SPB situated between 800 nm and 1600 nm (e.g., 850 nm, 1060 nm, 1310 nm, and/or 1550 nm). The optical fibers according to some embodiments of the present invention exhibit birefringence ($\Delta n$) of $0.4 \times 10^{-4}$ to $4 \times 10^{-4}$ at a wavelength of 450 nm to 1600 nm. For example, $\Delta n$ may be between $1 \times 10^{-4}$ to $3 \times 10^{-4}$ at a wavelength of 850 nm. FIG. 3 shows the measured OSA spectrum vs. wavelength when the fiber of FIG. 2A is positioned between a pair of cross polarizers. Both birefringence ($\Delta n$) and beat length of this exemplary PM fiber (fiber of FIG. 2A) can be calculated by information provided in FIG. 3. This fiber has beat length $L_B = (\Delta \lambda / \lambda) L$ of about 4.2 mm, where $\Delta \lambda$ is the peak to peak wavelength spacing in FIG. 3, $\lambda$ is the average wavelength, and L is the length of the measured fiber (In this embodiment L=1.965 m). The fiber has birefringence $\Delta n$ of about $2 \times 10^{-4}$ at $\lambda$=980 nm, which is similar to that achievable in the conventional PM fibers with B-only-doped-silica as stress member, but with the added benefit being thermally-stable up to the strain-point (about 650° C.) for the B/F-silica glass. We have experimentally verified that the stress level induced by the rods was unchanged until the strain point of the B/F-doped silica is reached.

One exemplary fiber with a cross-section similar to that shown FIG. 2A has a core relative refractive index delta of 0.68% and cladding relative refractive index delta of 0.58% (both relative to that of pure silica). Thus, effective core-delta of 0.1% of the core relative to the cladding (0.68%−0.58%=0.1%), corresponds to a core $N_A$ of about 0.06 in a LMA PM fiber design. The stress rods have a delta of −1.5% (also relative to pure silica). This fiber has a core diameter of 55 µm, and stress rod diameters of 100 µm. The stress rods 44, 46 are situated within the cladding 40, adjacent to the core 30, with the distance (wall-to-wall) between the core 30 and the stress rods 44, 46 of 25 µm. This fiber 20 has a birefringence of $0.43 \times 10^{-4}$ at $\lambda$=1 µm and Polarization extinction ratio of 15 dB at $\lambda$=1 µm. This fiber is a LMA active PM fiber, and thus is suitable for use in fiber lasers and fiber amplifiers. The fiber core 30 of this exemplary fiber comprises:

$Yb_2O_3$: 1.2 wt %,
$GeO_2$: 7.6 wt %,
$Al_2O_3$: 3 wt. %.

The cladding 40 of this exemplary fiber comprises silica doped with 9.4 wt % of $GeO_2$. The stress rods 44, 46 of this exemplary fiber comprise silica doped with:

$B_2O_3$: 4 wt. %,
F: 2.5 wt. %:

Another exemplary fiber with a cross-section similar to that shown FIG. 2D has a core delta of 0.1% and cladding delta of 0% (cladding is made of pure silica). The stress rods 44, 46 are "moon" shaped in cross-section and have a delta of −1.5%. More specifically, this fiber has a circular core 30 with diameter of 29 µm, and stress rod dimensions of 38 µm×110 µm. The stress rods cross-sections in this example are smaller than half circles. The stress rods 44, 46 are situated within the cladding 40, adjacent to the core 30, with the distance (wall-to-wall) between the core 30 and the stress rods 44, 46 of 9 µm. This fiber 20 has a birefringence of $4.32 \times 10^{-4}$ at $\lambda$=1 µm and beat length of 2.3 mm at $\lambda$=1 µm. This fiber is a passive PM fiber designed specifically for Raman Amplification. The fiber core 30 of this exemplary fiber is silica doped with 2 wt % of $GeO_2$. The cladding 40 of this exemplary fiber comprises pure silica. The stress rods 44, 46 of this exemplary fiber comprise silica doped with:

$B_2O_3$: 4 wt. %,
F: 2.5 wt. %:

The inventors' discovery of utilization of the mechanical-stress induced birefringence to control polarization properties of optical fibers provides unique advantages, such as lack of thermal sensitivity during operation. While not wishing to be bound by theory, applicants believe that mechanism of mechanically-induced high-birefringence provided by B—F codoped silica stress-member(s) can be explained as follows:

The general birefringence (B) achieved in the PM or SP fiber that uses stress members can be expressed as:

$$B = C \cdot (\sigma_t - \sigma_m), \quad (1)$$

where C is the stress-optical coefficient, $\sigma_t$ is the thermal-stress contribution, and $\sigma_m$ is the mechanical-stress contribution.

$$\sigma_t = \frac{2E\Delta\alpha\Delta T}{1-v} \quad (2)$$

and $$\sigma_m = F/A, \quad (3)$$

where E is the Young's modulus, $\Delta\alpha$ the differential-CTE between the stress member(s) and the cladding, $\Delta T$ temperature difference between fiber strain temperature and the room temperature, v is Poisson's ratio, F the fiber-drawing force, and A the area of the stress member(s).

Figure 4:
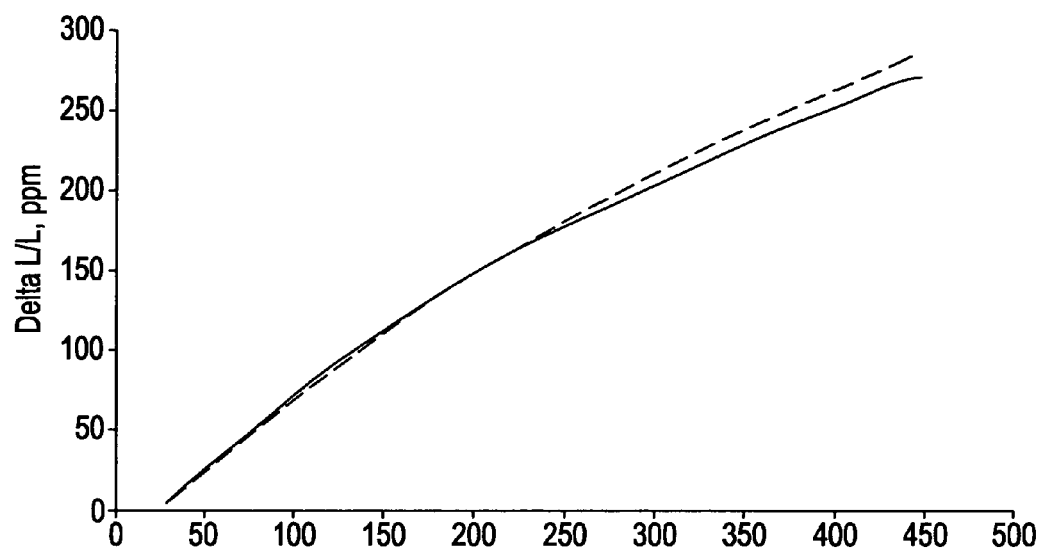
FIG. 4 is a plot of the coefficient of thermal-expansion (CTE) of a stress member that is utilized in some embodiments of the present invention.

In conventional PM fibers with high-B-doped-silica as the stress member(s), the thermal-term, $\sigma_t$, is the dominant factor contributing to the birefringence B. The thermal-stress term $\sigma_t$ is driven largely by an intentionally large differential-CTE, $\Delta\alpha$. In these fibers the mechanical-term, $\sigma_m$, is comparatively small and generally can be ignored (as has been shown in literature). That is, in conventional PM fibers $\sigma_t \gg \sigma_m$ (e.g, $\sigma_t$ is at least 10 times larger than $\sigma_m$). In contrast, when the B-and-F-doped-silica is used as the stress member(s), the differential-CTE, $\Delta\alpha$, becomes small (almost nothing). In one embodiment, B-and-F-doped-silica stress member(s) have a measured CTE (about $6 \times 10^{-7}/°$ C. to $8 \times 10^{-7}/°$ C.), as calculated from data shown in FIG. 4, which is very similar to that of pure-silica glass. (CTE of silica is about $5.5 \times 10^{-7}/°$ C.) Thus, the dominate force for the birefringence, B, as shown in equation (1), in this case is almost totally the mechanical term, $\sigma_m$. The insensitivity of the $\sigma_m$ to temperature, as shown in equation (3), is consequently responsible for the thermal-stability of the PM fiber made by using B-and-F-doped-silica stress member(s). Therefore, it is preferable that the stress-optical coefficient C be as large as possible, and preferably greater than $10^{-4}$/Mpa, provided that the condition of $\sigma_t < \sigma_m$, and preferably $\sigma_t \ll \sigma_m$ (e.g., $\sigma_m = 10\sigma_t$ or larger) be satisfied for thermally-insensitive operation.

One other important attribute when the B-and-F-doped-silica used as the stress member(s) is its large stress-optical coefficient, for which our experimental data has shown a value up to about $5 \times 10^{-4}$/Mpa, which is much higher than those of all other silica-based glasses known. It's not clear at the moment what causes the large stress-optical coefficient in B/F codoped silica fiber, nor the CTE value similar to pure silica exhibited in this material. (For example, CTE difference of B-and-F-doped-silica, relative to that of pure silica glass, in exemplary embodiments is less than $3 \times 10^{-7}$ and preferably less than $2 \times 10^{-7}$). It is highly plausible that certain structural effect through B and F codoping into silica play a significant role. Our preliminary work in this regard has shown clear evidence of B—F bond formation in the glass. Regardless, these unique attributes, namely low CTE and large stress-optical coefficient, seen in this B-and-F codoped-silica glass has made this glass a highly valued and effective stress member(s)element for making PM/SP optical fibers with high thermal stability.

A fiber cladding 40 preferably has a conventional outer diameter of about 125 microns or more and has a composition of preferably substantially pure silica. Optionally, cladding 40 may include other suitable dopants, such as fluorine, and the outer diameter may be reduced, if size constraints so dictate.

The single polarization fibers 20, according to some of embodiments of the present invention exhibit optical properties enabling single polarization (transmission of one, and only one, polarization mode) within a designed single polarization band (SPB). Preferably, the SPB of the single polarization fiber according to the invention is designed to be located between about 800 nm-1600 nm. Most preferably, the fiber's SPB coincides with 980, 1310 or 1550 nm such that it is readily useable with optical components operating at 980, 1310 or 1550 nm. In particular, it is preferred that the center wavelength of the SPB substantially coincides (within about +/−20 nm) with the center wavelength of the operating wavelength of the component. Further, the SP fibers in accordance with the invention preferably exhibit an extinction ratio at 978 nm of equal to or greater than 15 dB; and more preferably equal to or greater than 20 dB within the SPB.

Figure 5:
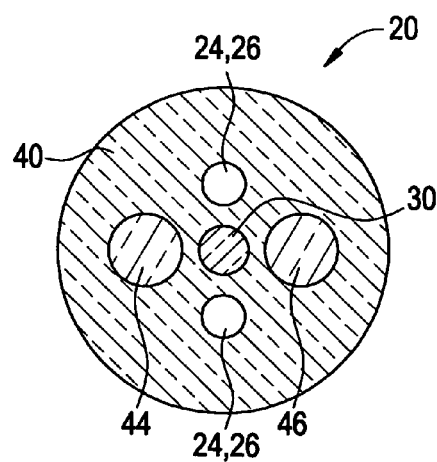
FIG. 5 is a schematic cross-sectional view of another embodiment of the single polarization optical fiber in accordance with the present invention.

An embodiment of single polarization fiber according is shown schematically in FIG. 5. This single polarization fiber includes stress rods 44, 46 and multiple air holes 24, 26 within the cladding 40. The analysis of this fiber was performed by numerical modeling which takes into account the combined birefringence from the stress rods 44, 46 and the form birefringence from the air holes 24, 26. The air holes 24, 26 also play an additional role of inducing the fundamental mode cutoff, so that with the high birefringence the two polarization modes reach the fundamental mode cutoff at different wavelengths. This allows single polarization operation between two fundamental mode cutoff wavelengths corresponding to the two polarization modes. This fiber has a central core 30 having a diameter of about 8.8 microns with core delta of 0.2 percent relative to the cladding. The stress rods 44, 46 have diameter of 12 microns and contribute birefringence of $2.02 \times 10^{-4}$. In this exemplary embodiment the distance from the rod center to the core center is 11 microns. The air holes have diameter of 12 microns with the distance between the fiber center and the air hole center to be around 10.4 microns. The cladding is formed of pure silica. The stress rods 44, 46 and holes 24, 26, in this embodiment, substantially abut the sides of the central core 30. This single polarization fiber exhibits single polarization behavior between 1238 nm and 1329 nm with the width of the single polarization operating window around 91 nm.

It will be apparent to those skilled in the art that variations and modifications can be made to the present invention without departing from the scope of the invention. Thus, it is intended that the present invention cover the modifications and variations of this invention provided they co me within the scope of the appended claims and their equivalents.

What is claimed is:

1. A polarization maintaining or single polarization optical fiber, comprising:
   (i) a core,
   (ii) a cladding surrounding the core,
   (iii) at least one stress member adjacent the fiber core and situated within the cladding, said stress member consisting essentially of: silica co-doped with B and F, said least one stress member providing polarization maintaining and/or single polarization property to said fiber, and has thermal stress coefficient $\sigma_t$ and mechanical stress coefficient $\sigma_m$, and $\sigma_t < \sigma_m$.

2. The optical fiber of claim 1 wherein the central core is silica based, and is surrounded by said stress member, said stress member being an annular region of boron-fluorine doped silica.

3. The optical fiber of claim 1 wherein at least one stress member includes at least two stress rods situated on opposite sides of said core.

4. The optical fiber of claim 3 wherein said stress rods have a circular cross-section with diameter d, wherein 10 µm<d<15 µm.

5. The optical fiber of claim 3, wherein said fiber is an LMA fiber, and wherein said stress rods have a circular cross-section with diameter d, wherein and 25 µm<d<250 µm.

6. The optical fiber of claim 1 further comprising a polarization extinction ratio of greater than equal to 15 at operating wavelength.

7. The optical fiber of claim 1 exhibiting attenuation of less than 0.02 dB/m at operating wavelength.

8. The optical fiber of claim 1 wherein said stress member has 2 wt %<B<6 wt %, and 1.5 wt %<F<3.5 wt %.

9. The optical fiber of claim 1 wherein said stress member has CTE which is essentially equal to that of pure silica within temperatures of −100° C. to 600° C.

10. The optical fiber of claim 1 wherein said stress member has a CTE between $1 \times 10^{-7}$ and $15 \times 10^{-7}$.

11. The optical fiber of claim 1 wherein said stress member has stress-optical coefficient C, and $C > 10^{-4}$/Mpa.

12. The polarization maintaining or single polarization optical fiber comprising:
   (i) a core,
   (ii) a cladding surrounding the core, (iii) at least one stress member adjacent the fiber core and situated within the cladding, said stress member consisting essentially of silica co-doped with B and F, such that said fiber exhibits birefringence of $0.4 \times 10^{-4}$ to $4 \times 10^{-4}$ at a wavelength of 450 nm to 1600 nm, wherein the stress member has thermal stress coefficient $\sigma_t$ and mechanical stress coefficient $\sigma_m$, and $\sigma_t < \sigma_m$.

13. An optical fiber, comprising:
(i) a core,
(ii) a cladding surrounding the core, and
(iii) at least one stress member adjacent the fiber core and situated within the cladding, said stress member comprising silica co-doped with B and F, wherein said stress member has thermal stress coefficient $\sigma_t$ and mechanical stress coefficient $\sigma_m$, and $\sigma_t < \sigma_m$.

14. The optical fiber according to claim 13, wherein $10\sigma_t < \sigma_m$.

15. An optical fiber, comprising:
(i) a core,
(ii) a cladding surrounding the core,
(iii) at least one stress member adjacent the fiber core and situated within the cladding, said stress member comprising silica co-doped with B and F, wherein the optical fiber exhibiting birefringence of $0.4 \times 10^{-4}$ to $4 \times 10^{-4}$ at a wavelength within the range of 450 nm to 1600 nm and/or a single polarization mode within an operating wavelength range of 800 nm to 1600 nm, wherein the stress member has thermal stress coefficient $\sigma_t$ and mechanical stress coefficient $\sigma_m$, and $\sigma_t < \sigma_m$.

16. The optical fiber of claim 15 wherein said at least one stress member has 2 wt%<B<6 wt%, and 1.5 wt%<F<3.5 wt%.

17. The optical fiber of claim 15 wherein said at least one stress member has a CTE between $3 \times 10^{-7}/°C$ and $8 \times 10^{-7}/°C$.

18. The optical fiber of claim 15 wherein said at least one stress member has stress-optical coefficient C, and $C > 10^{-4}/\text{Mpa}$.

19. The optical fiber of claim 15 wherein the central core is silica based; and the stress member either: (i) includes at least two stress rods situated on opposite sides of said core; or (ii) surrounds said core.

20. The optical fiber of claim 15 wherein said stress member has less than 6 wt% B.

* * * * *